(12) United States Patent
Chang et al.

(10) Patent No.: US 9,354,699 B2
(45) Date of Patent: May 31, 2016

(54) INPUT DEVICE AND RELATED METHOD

(71) Applicant: PixArt Imaging Inc., Hsin-Chu (TW)

(72) Inventors: Yen-Min Chang, Hsin-Chu (TW); Chun-Wei Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 139 days.

(21) Appl. No.: 13/732,424

(22) Filed: Jan. 1, 2013

(65) Prior Publication Data

US 2014/0104159 A1 Apr. 17, 2014

(30) Foreign Application Priority Data

Oct. 16, 2012 (TW) .............................. 101138062 A

(51) Int. Cl.
*G06F 3/041* (2006.01)
*G06F 3/01* (2006.01)
*G06F 3/038* (2013.01)

(52) U.S. Cl.
CPC *G06F 3/01* (2013.01); *G06F 3/038* (2013.01); *G06F 2203/0384* (2013.01)

(58) Field of Classification Search
CPC . H04L 12/2809; H04L 12/282; H04L 41/082; H04L 63/0884; H04L 67/16; H04L 67/34; H04L 67/303; H04W 12/06

USPC .................................. 345/173, 1.1–3.1, 156
See application file for complete search history.

(56) References Cited

U.S. PATENT DOCUMENTS

| | | | |
|---|---|---|---|
| 2010/0295785 A1* | 11/2010 | Lu et al. ......................... | 345/159 |
| 2011/0095983 A1* | 4/2011 | Lu et al. ......................... | 345/166 |
| 2012/0047304 A1* | 2/2012 | Lee ................................ | 710/305 |
| 2014/0075377 A1* | 3/2014 | Kang et al. .................... | 715/788 |
| 2014/0104183 A1* | 4/2014 | Caron .................... | G08C 17/02 |
| | | | 345/173 |

* cited by examiner

*Primary Examiner* — Kent Chang
*Assistant Examiner* — Nelson Rosario
(74) *Attorney, Agent, or Firm* — Winston Hsu; Scott Margo

(57) ABSTRACT

An input device for transmitting a signal between a terminal device and an external device is disclosed in the present invention. The input device includes an input unit, a terminal communication unit, a wireless transmission unit and a processor. The input unit generates an operation signal. The terminal communication unit establishes a connection to the terminal device. The wireless transmission unit establishes a connection to the external device for receiving a first datum signal outputted from the external device. The processor is electrically connected to the input unit, the terminal communication unit and the wireless transmission unit. The processor respectively transmits the operation signal and the first datum signal to the terminal device via the terminal communication unit.

16 Claims, 5 Drawing Sheets

INPUT DEVICE AND RELATED METHOD

BACKGROUND OF THE INVENTION

1. Field of the Invention

The present invention relates to an input device, and more particularly, to an input device capable of transmitting a signal between a terminal device and an external device and a related operating method.

2. Description of the Prior Art

A conventional input unit is connected to the terminal device for transmitting a control command. For example, the input unit can be the mouse, the keyboard and the writing pad. The terminal device can be the computer host. The input unit can generate an operation signal and transmit the operation signal to the computer host via a transmission cable or wireless communication for actuating the application program of the computer host. The input unit is a necessary component of the computer host. With the advanced technology, the computer host further includes the network transmission unit, the wireless transmission unit and so on. The transmission units of the computer host are plenty and complicated. Therefore, design of an input device capable of integrating the transmission units with different format is an important issue of the computer industry.

SUMMARY OF THE INVENTION

The present invention provides an input device capable of transmitting a signal between a terminal device and an external device and a related operating method for solving above drawbacks.

According to the claimed invention, an input device for transmitting a signal between a terminal device and an external device is disclosed. The input device includes an input unit, a terminal communication unit, a wireless transmission unit and a processor. The input unit generates an operation signal. The terminal communication unit establishes connection to the terminal device. The wireless transmission unit establishes connection to the external device. The wireless transmission unit receives a first datum signal outputted from the external device. The processor is electrically connected to the input unit, the terminal communication unit and the wireless transmission unit. The processor respectively transmits the operation signal and the first datum signal to the terminal device via the terminal communication unit. Electrically connection means that there is a connection between at least two devices for electrical signals to transmit between the devices. There may be some buffer/impedance/amplifier in the connection path which would not affect characters of the electrical signals.

According to the claimed invention, a method of transmitting a signal between an input device, a terminal device and an external device in a multiplexed scheduling manner is disclosed. The method includes utilizing a terminal communication unit to establish connection to the terminal device, utilizing a wireless transmission unit to establish connection to the external device, receiving a first datum signal outputted from the external device via the wireless transmission unit, receiving an operation signal via an input unit, and transmitting the first datum signal and the operation signal to the terminal device respectively via the terminal communication unit.

The present invention disposes the wireless transmission unit inside the input device to establish the connection to the external device. Because the input device is connected to the terminal device via the terminal communication unit, the input device can be the datum-exchange relay station between the terminal device and the external device, to increase operational convenience and market competition of the input device. In addition, the input device of the present invention can transmit information with different format in the multiplexed scheduling manner for rapidly reaction. Transmission procedures of the signals, such as the operation signal (the coordinate information) and the first datum signal (the storage information), are executed at specific period by turns. A time interruption is generated after a predetermined period by the processor to switch the transmission procedures. Therefore, the input device of the present invention can stably execute the datum exchange between the terminal device and the external device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
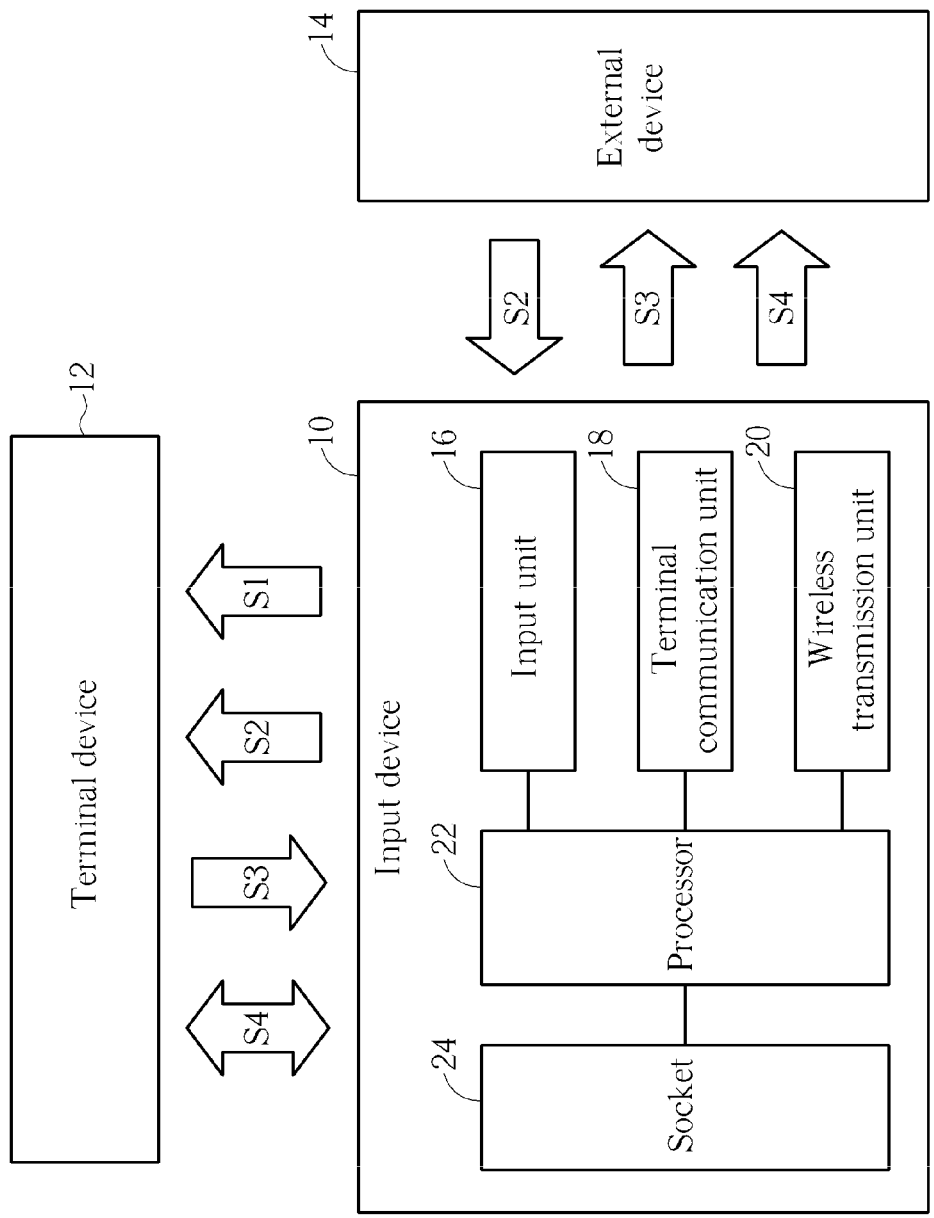
FIG. 1 is a functional block diagram of an input device according to an embodiment of the present invention.

Please refer to FIG. 1. FIG. 1 is a functional block diagram of an input device 10 according to an embodiment of the present invention. The input device 10 can transmit a signal between a terminal device 12 and an external device 14. The input device 10 can be a mouse, a keyboard, a writing pad and so on. The terminal device 12 can be a computer host, and the external device 14 can be a portable electronic device, such as the smart phone. The input device 10 of the present invention can establish connection to the terminal device 12 by wire communication or wireless communication. As an operation signal S1 is generated by the input device 10, the terminal device 12 can read the operation signal S1 via the connection and execute the corresponding application program. The input device 10 of the present invention can connect to the external device 14 by the wireless communication. The input device 10 can be a relay station for datum exchange between the terminal device 12 and the external device 14, so as to increase convenience and competition of the product.

As shown in FIG. 1, the input device 10 includes an input unit 16, a terminal communication unit 18, a wireless transmission unit 20 and a processor 22. The input unit 16 can generate the operation signal S1 according to user's operation. The processor 22 is electrically connected to the input unit 16, the terminal communication unit 18 and the wireless transmission unit 20. The processor 22 can control the terminal communication unit 18 and the wireless transmission unit 20 to establish connection respectively to the terminal device 12 and the external device 14. The wireless transmission unit 20 can receive a first datum signal S2 outputted from the external device 14, the first datum signal S2 can be music, document or image information. The processor 22 can transmit the operation signal S1 and the first datum signal S2 respectively to the terminal device 12 via the terminal communication unit 18 according to user's setting. The processor 22 further can receive a second datum signal S2 outputted from the terminal device 12 via the terminal communication unit 18, and transmit the second datum signal S3 to the external device 14 via the wireless transmission unit 20 for the datum exchange between the terminal device 12 and the external device 14.

The input device 10 of the present invention not only can establish the connection to the terminal device 12, but also can connect to one or more external devices 14. The input device 10 can connect to the terminal device 12 via specific communication protocol, such as the universal serial bus interface, the Bluetooth interface and 2.4 G wireless communication interface. Besides, the input device 10 can connect to the external device 14 with any amounts via the wireless transmission interface. As the datum exchange between the terminal device 12 and the external device 14 is executed, the processor 22 of the input device 10 can transmit the operation signal S1 and the first datum signal S2 respectively to the terminal device 12 in a multiplexed scheduling manner. For example, the operation signal S1 has priority to be transmitted by the processor 22 when the input device 10 is in use. The processor 22 further can transmit the first datum signal S2 at an interval of transmission of the operation signal S1. Bandwidth of the datum exchange can be completely applied to transmit the first datum signal S2 by the processor 22 when the input device 10 is out of use. Generally, the operation signal S1, the first datum signal S2 and the second datum Signal S3 are preferably encoded for the datum transmission. The encoding procedure includes packing, encrypting and deciphering processes. The datum transmission can further be executed by primitive format. In addition, the encoding procedure can be executed by the processor 22, the input unit 16, the terminal device 12 or the external device 14, selectively.

Figure 2:
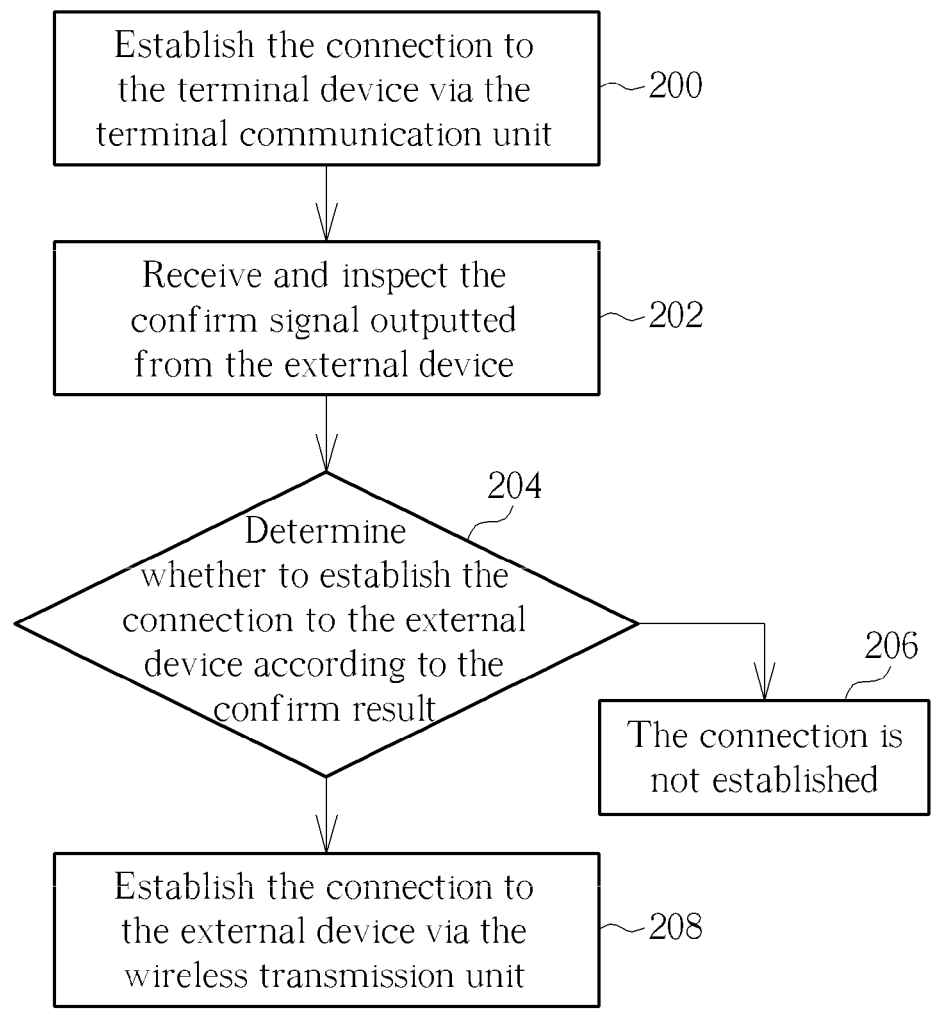
FIG. 2 is a flow chart of establishing the connection according to the embodiment of the present invention.

Please refer to FIG. 2. FIG. 2 is a flow chart of establishing the connection according to the embodiment of the present invention. The method of establishing the connection shown in FIG. 2 is applied to the input device 10 shown in FIG. 1. First, step 200 is executed. The processor 22 establishes the connection to the terminal device 12 via the terminal communication unit 18 by the specific communication protocol. Then, step 202 is executed to receive and inspect a confirm signal outputted from the external device 14. An amount of the external device 14 can be the singular number or the plural number, which means that the input device 10 of the present invention can simultaneously connect to the plurality of external devices 14. Then, step 204 is executed. The processor 22 inspects each external device 14 to determine whether the received confirm signal conforms to predetermined standard, so as to allow the connection establishment between the wireless transmission unit 20 and each external device 14 or not. As the confirm signal is wrong, step 206 is executed to shut down connection procedure for preventing the input device 10 from virus. As the confirm signal is correct, step 208 is executed. The processor 22 can establish the connection to the corresponding external device 14 via the wireless transmission unit 20, so as to actuate the datum exchange between the terminal device 12 and the external device 14.

Figure 3:
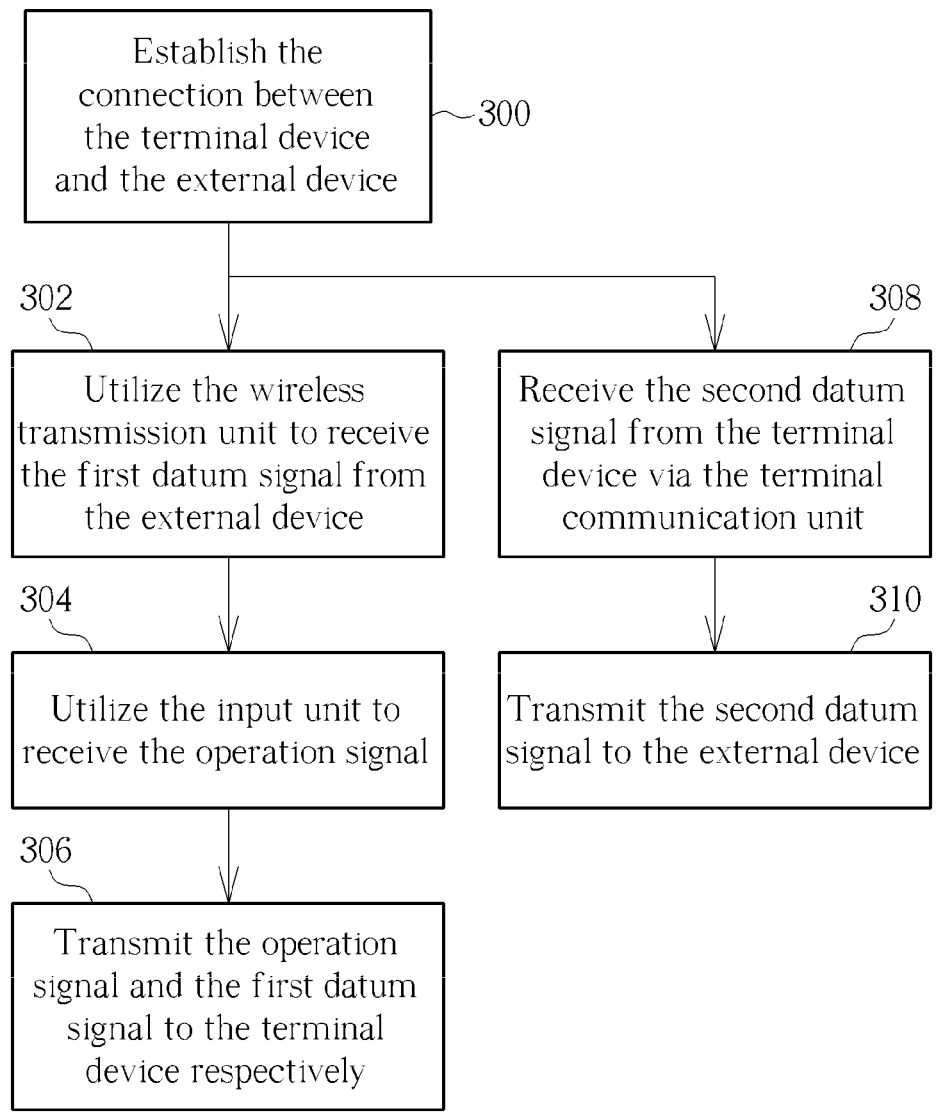
FIG. 3 is a flow chart of transmitting the signals in the multiplexed scheduling manner according to the embodiment of the present invention.

Please refer to FIG. 3. FIG. 3 is a flow chart of transmitting the signals in the multiplexed scheduling manner according to the embodiment of the present invention. The method of transmitting the signals in the multiplexed scheduling manner shown in FIG. 3 is applied to the input device 10 shown in FIG. 1. First, step 300 is executed to establish the connection between the input device 10, the terminal device 12 and the external device 14 according to the method shown in FIG. 2. Then, step 302 and step 304 can be respectively executed or be simultaneously executed, alternatively. The input unit 16 and the wireless transmission unit 20 are utilized to receive the operation signal S1 and the first datum signal S2. Sequence of step 302 and step 304 is not limited to the above-mentioned one. Then, step 306 is executed to respectively transmit the operation signal S1 and the first datum signal S2 to the terminal device 12. The input device 10 of the present invention can transmit the operation signal S1 (such as coordinate information of the mouse) and the first datum signal S2 (such as storage information of the smart phone) to the terminal device 12 by turns, and can set schedule beforehand to achieve the purpose of multiply rapid datum transmission. Furthermore, step 308 is executed selectively. The processor 22 can receive the second datum signal S3 outputted from the terminal device 12. Then step 310 is executed to transmit the second datum signal S3 to the external device 14, so that the input device 10 of the present invention can transmit the data from the terminal device 12 to the external device 14.

Figure 4:
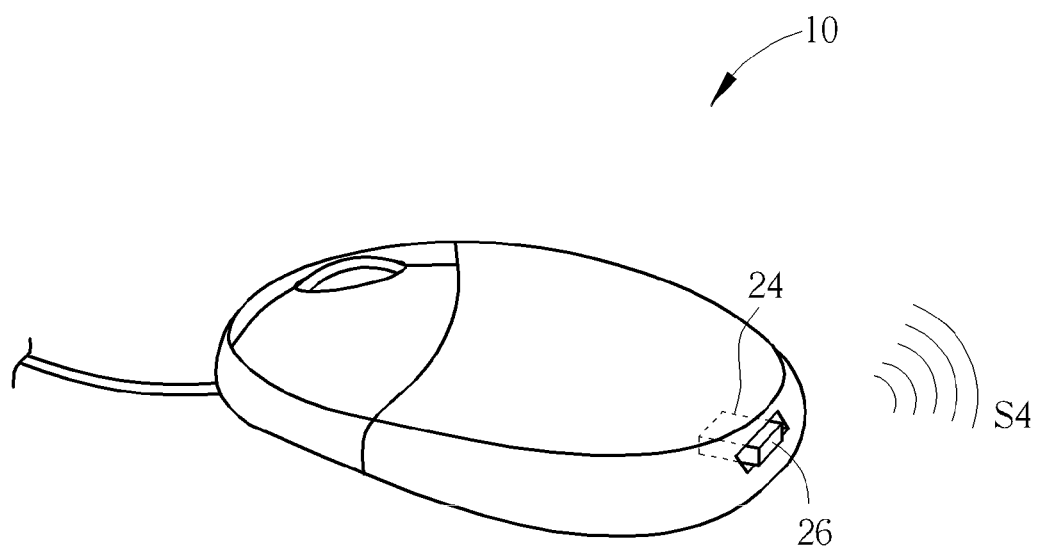
FIG. 4 is a diagram of the input device according to the embodiment of the present invention.

It should be mentioned that the input device 10 can further include a socket 24 electrically connected to the processor 22. Please refer to FIG. 1 and FIG. 4. FIG. 4 is a diagram of the input device 10 according to the embodiment of the present invention. A communication chip 26 can insert into the socket 24 to actuate the wireless access function. The communication chip 26 can be a SIM card or a wireless network card, which is detachably disposed inside the socket 24 and transmits digital information within a predetermined frequency band. The frequency band is set according to specification of the communication chip 26, and detailed description is omitted herein for simplicity. Because the input device 10 is electrically connected to the terminal device 12, the processor 22 can receive a communication signal S4 from the terminal device 12 via the terminal communication unit 18, and further transmit the communication signal S4 via the communication chip 26, so that the input device 10 can receive network signals from the computer host and be the wireless access station for the external device 14. Besides, the processor 22 further can receive the communication signal S4 via the communication chip 26, and transmit the communication signal S4 to the terminal device 12 via the terminal communication unit 18, so that the input device 10 can receive the network signals (such as 3 G or WiFi signals) to be the wireless access station for the terminal device 12 and the external device 14.

Figure 5:
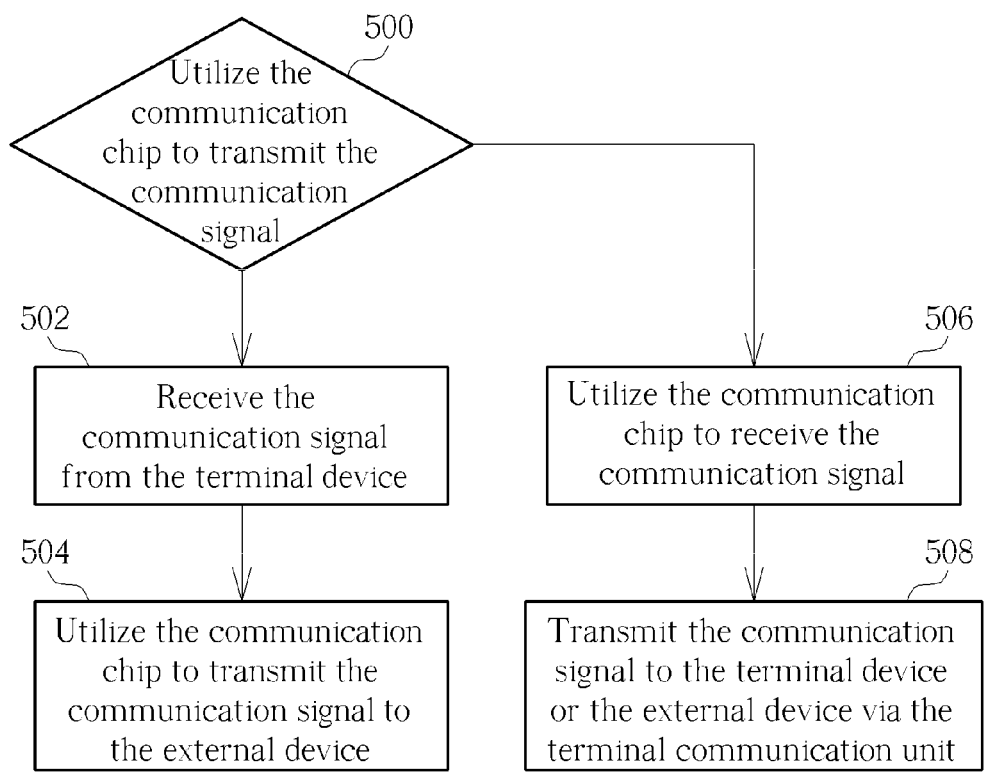
FIG. 5 is a flow chart of transmitting the communication signal according to the embodiment of the present invention.

Please refer to FIG. 5. FIG. 5 is a flow chart of transmitting the communication signal S4 according to the embodiment of the present invention. The method of transmitting the communication signal S4 shown in FIG. 5 is applied to the input device 10 shown in FIG. 1 and FIG. 4. First, step 500 is executed to insert the communication chip 26 into the socket 24 for transmission of the communication signal S4. Step 502 is executed when the communication signal S4 is transmitted from the terminal device 12, and the terminal communication unit 18 is utilized to receive the communication signal S4 from the terminal device 12. Then, step 504 is executed. The processor 22 can transmit the communication signal S4 via the communication chip 26, and the communication signal S4 is received by the external device 14, which means that the input device 10 of the present invention receives the communication signal S4 outputted from the terminal device 12 and can be the wireless access station for providing the network signals toward the external device 14. Further, step 506 is executed to utilize the communication chip 26 to receive the communication signal S4 by the wireless communication. Then, step 508 is executed. The processor 22 can transmit the communication signal S4 to the terminal device 12 or the external device 14 via the terminal communication unit 18, so that the input device 10 can receive the network signals to be the wireless access station, and provide the network signals to the terminal device 12 and the external device 14.

As the input device is the mouse and the terminal device is the computer host, the mouse can be controlled to generate a series of operation signals. At this time, the mouse can establish the connection to the external device, and the external device can be the smart phone, the tablet computer and so on. The storage information of the smart phone, such as the audio archive, the image archive and the document archive, can be transferred to the computer host via the input device. Information of the computer host can be transferred to the smart phone via the input device. In addition, the input device can be the wireless access station to share the network signal from the computer host to the smart phone and the tablet computer, so the external device can connect to the Internet. The input device further can receive the network signal outputted by the external device, and transmit the network signal to the computer host for Internet connection. The input device can further utilize the communication chip (such as wireless communication chip) to directly receive the communication signal, and simultaneously share the communication signal to the computer host, the smart phone and the tablet computer for the multiply Internet connection.

The signals are transmitted between the mouse and the computer host in the multiplexed scheduling manner. Generally, the operation signal has priority to be transmitted by the mouse, and the confirm signal or the datum signal can be transmitted at the interval between the each operation signal and the next operation signal for the connection establishment or the datum exchange. Thus, the input device of the present invention can effectively utilize the frequency band between the mouse and the computer host to respectively transmit the operation signal and the datum signal to the computer host, so as to control the computer host by the mouse and utilize the mouse to exchange the datum with the external device simultaneously.

In conclusion, the present invention disposes the wireless transmission unit inside the input device to establish the connection to the external device. Because the input device is connected to the terminal device via the terminal communication unit, the input device can be the datum-exchange relay station between the terminal device and the external device, to increase operational convenience and market competition of the input device. In addition, the input device of the present invention can transmit information with different format in the multiplexed scheduling manner for rapidly reaction. Transmission procedures of the signals, such as the operation signal (the coordinate information) and the first datum signal (the storage information), are executed at specific period by turns. A time interruption is generated after a predetermined period by the processor to switch the transmission procedures. Therefore, the input device of the present invention can stably execute the datum exchange between the terminal device and the external device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input device for transmitting a signal between a terminal device and an external device, the input device being a mouse or a keyboard invariably connected with the terminal device to receive a request from the terminal device, the input device comprising:

an input unit for generating an operation signal, the operation signal being transmitted to the terminal device according to the request;

a terminal communication unit establishing connection to the terminal device;

a wireless transmission unit establishing connection to the external device, the wireless transmission unit being for receiving a first datum signal outputted from the external device; and a processor electrically connected to the input unit, the terminal communication unit and the wireless transmission unit, the processor transmitting the operation signal and the first datum signal being transmitted to the terminal device at transmission break of the operation signal while the input unit is in use, the processor further utilizing full bandwidth of the terminal communication unit to transmit the first datum signal while the input unit is out of use.

2. The input device of claim 1, wherein the processor further receives a second datum signal outputted from the terminal device via the terminal communication unit, and utilizes the wireless transmission unit to transmit the second datum signal to the external device.

3. The input device of claim 1, wherein the processor executes the signal transmission by primitive format or by encoding procedure.

4. The input device of claim 1, wherein the processor inspects a confirm signal outputted from the external device before connection establishment between the wireless transmission unit and the external device.

5. The input device of claim 4, wherein the processor further respectively inspects the confirm signals outputted from a plurality of external devices, so as to establish the corresponding connection between the wireless communication unit and each external device.

6. The input device of claim 1, further comprising:
a socket electrically connected to the processor, a communication chip being detachably disposed inside the socket.

7. The input device of claim 6, wherein the processor receives a communication signal from the terminal device via the terminal communication unit, and utilizes the communication chip to transmit the communication signal.

8. The input device of claim 6, wherein the processor utilizes the communication chip to receive a communication signal, and transmits the communication signal to the terminal device via the terminal communication unit.

9. A method of transmitting a signal between an input device, a terminal device and an external device in a multiplexed scheduling manner, the input device being a mouse or a keyboard invariably connected with the terminal device to receive a request from the terminal device, the method comprising:

utilizing a terminal communication unit to establish connection to the terminal device;

utilizing a wireless transmission unit to establish connection to the external device;

receiving a first datum signal outputted from the external device via the wireless transmission unit;

generating an operation signal via an input unit and transmitting the operation signal to the terminal device according to the request; and transmitting the operation signal to the terminal device and further transmitting the first datum signal to the terminal device at transmission break of the operation signal while the input unit is in use; and transmitting first datum signal to the terminal device by full bandwidth of the terminal communication unit while the input unit is out of use.

10. The method of claim 9, further comprising:
receiving a second datum signal outputted from the terminal device via the terminal communication unit; and
transmitting the second datum signal to the external device via the wireless transmission unit.

11. The method of claim 9, further comprising:
executing signal transmission by primitive format or by encoding procedure.

12. The method of claim 9, further comprising:
receiving and inspecting a confirm signal outputted from the external device; and
determining whether to establish connection between the wireless transmission unit and the external device according to a confirm result.

13. The method of claim 12, further comprising:
receiving and respectively inspecting confirm signals outputted from a plurality of external devices; and
determining whether to establish the corresponding connection between the wireless transmission unit and each external device according to confirm results.

14. The method of claim 9, further comprising:
transmitting a communication signal via a communication chip.

15. The method of claim 14, wherein transmitting the communication signal via the communication chip comprises:
receiving the communication signal from the terminal device; and
transmitting the communication signal to the external device via the communication chip.

16. The method of claim 14, wherein transmitting the communication signal via the communication chip comprises:
receiving the communication signal via the communication chip; and
transmitting the communication signal to the terminal device via the terminal communication unit.

* * * * *